(12) United States Patent
Ninomiya et al.

(10) Patent No.: US 7,354,960 B2
(45) Date of Patent: Apr. 8, 2008

(54) WATER-BASED INK AND PROCESS FOR PRODUCING WATER-BASED INK

(75) Inventors: Hidetaka Ninomiya, Mitaka (JP); Masaki Nakamura, Akiruno (JP); Akihiko Takeda, Sagamiko-machi (JP)

(73) Assignee: Konica Minolta Holdings Inc., Tokyo (JP)

( * ) Notice: Subject to any disclaimer, the term of this patent is extended or adjusted under 35 U.S.C. 154(b) by 389 days.

(21) Appl. No.: 10/499,085

(22) PCT Filed: Dec. 20, 2002

(86) PCT No.: PCT/JP02/13367

§ 371 (c)(1), (2), (4) Date: Jun. 15, 2004

(87) PCT Pub. No.: WO03/055951

PCT Pub. Date: Jul. 10, 2003

(65) Prior Publication Data

US 2005/0043435 A1  Feb. 24, 2005

(30) Foreign Application Priority Data

Dec. 25, 2001  (JP) .............................. 2001-390863

(51) Int. Cl.
*C09D 11/00* (2006.01)

(52) U.S. Cl. ...................................... 523/160; 523/161
(58) Field of Classification Search ................ 523/160, 523/161
See application file for complete search history.

(56) References Cited

U.S. PATENT DOCUMENTS

| | | | | |
|---|---|---|---|---|
| 5,292,660 | A * | 3/1994 | Overbeek et al. | 435/262 |
| 6,031,019 | A * | 2/2000 | Tsutsumi et al. | 523/160 |
| 6,057,384 | A * | 5/2000 | Nguyen et al. | 523/160 |
| 6,465,567 | B1 * | 10/2002 | Grobe et al. | 524/611 |
| 6,727,296 | B1 * | 4/2004 | Pears et al. | 523/160 |
| 2003/0144378 | A1 * | 7/2003 | Mizushima et al. | 523/160 |
| 2004/0068029 | A1 * | 4/2004 | Wang et al. | 523/160 |

FOREIGN PATENT DOCUMENTS

JP  2000109736 A  *  4/2000

OTHER PUBLICATIONS

Machine Translation of JP 2000-109736 A (2000).*

* cited by examiner

*Primary Examiner*—Edward J. Cain
(74) *Attorney, Agent, or Firm*—Lucas & Mercanti, LLP

(57) ABSTRACT

A water-based ink containing colored microparticles containing a dye and a polymer dispersed in water, wherein a total amount of a monomer remaining in the colored microparticles is less than or equal to 5000 ppm based on the total weight of the water-based ink.

11 Claims, No Drawings

WATER-BASED INK AND PROCESS FOR PRODUCING WATER-BASED INK

TECHNICAL FIELD

The present invention relates to a water-based ink and a manufacturing method thereof, particularly, to a water-based ink suitable for ink-jet application and specifically to a water-based ink which is superior in dispersion stability and contains a water-based dispersion of dye-containing colored microparticles.

BACKGROUND

In recent years, being solvent-free and water-based has been required also with respect to recording materials and inking materials utilized for such as a printer, a printing-machine, a marker and a writing tool. Particularly, as water-based recording materials, widely utilized are those comprising primarily an aqueous solution of a water-soluble dye or micro-dispersion of a pigment.

As a water-based ink employing a water-soluble dye, mainly utilized are those comprising an aqueous solution of a water-soluble dye classified into such as acid dyes, direct dyes and a part of food dyes being added with a glycol series or a alkanolamine series as a moisture retaining agent, a surfactant to control the surface tension, and appropriately a viscosity increasing agent. Such a water-based ink employing a water-soluble dye is most generally used with respect to high reliability causing no clogging at a pen tip or in a printer, however, it cannot be helped that the application purpose is limited and recording quality is deteriorated due to easy blotting on recording paper. That is, a water-soluble dye, which immerses into a recording paper to be dried and adhered, is hardly said to be dyed resulting in exhibiting very poor light fastness.

Further, to solve a problem that a a water-based ink employing a water-soluble dye is poor in water resistance and light fastness, a proposal in which a water-dispersible resin is colored by an oil-soluble dye or a hydrophobic dye has been made as ink for ink-jet recording. For example, ink utilizing emulsion polymerization particles being dyed with an oil-soluble dye or dispersed polymer particles is proposed in such as JP-A Nos. 55-139471, 58-45272, 3-250069, 8-253720, 8-92513, 8-183920 and 2001-11347 (hereinafter, JP-A refers to Japanese Patent Publication Open to Public inspection). Attempts have been made not only to color a water-soluble resin with an oil-soluble dye or a hydrophobic dye but also to utilize colored microparticles comprising a colorant and a resin covered therewith or colored microparticles in which colored particles comprising a colorant and a resin are further covered with a film-forming resin.

Water resistance and light fastness of a water-based ink are surely improved by these techniques. However, when a residual monomer presents in colored microparticles, it may dissolve a dye to increase the particle diameter or adhere on the nozzle surface to change physical properties resulting in deterioration of ejection stability. Further, it has been proved that the residual monomer may become a radical generating source to accelerate image deterioration when it presents in an image.

SUMMARY

An object of the invention is to provide a water-based ink which exhibits an excellent dispersion stability of colored microparticles, as well as superior ejection stability and excellent light fastness when being utilized for ink-jet recording, and a manufacturing method thereof.

The above object of this invention can be achieved by the following embodiments.

(1) A water-based ink comprising colored microparticles containing a dye and a polymer dispersed in water,
wherein a total amount of a monomer remaining in the colored microparticles is less than or equal to 5000 ppm based on the total weight of the water-based ink.

(2) The water-based ink of Item 1,
wherein the total amount of the monomer remaining in the colored microparticles is less than or equal to 1000 ppm based on the total weight of the water-based ink.

(3) The water-based ink of Item 2,
wherein the total amount of the monomer remaining in the colored microparticles is less than or equal to 100 ppm based on the total weight of the water-based ink.

(4) The waterbased ink of Item 1,
wherein the total amount of the monomer which has a homopolymer converted solubility parameter (SP value) of not more than 20 $(J/cm^3)^{1/2}$ is not more than 1,000 ppm.

(5) The waterbased ink of Item 4,
wherein the total amount of the monomer which has a homopolymer converted solubility parameter (SP value) of not more than 20 $(J/cm^3)^{1/2}$ is not more than 100 ppm.

(6) The water-based ink of Item 1,
wherein each of the colored microparticles has a core/shell structure.

(7) The water-based ink of Item 1,
wherein an average particle diameter of the colored microparticles is not more than 100 nm.

(8) A method for manufacturing the water-based ink of Item 1 comprising the steps of:
dispersing the colored microparticles containing the dye and the polymer in water so as to form a dispersion; and
eliminating a monomer in the dispersion by means of ultrafiltration or an adsorbent treatment.

(9) An ink-jet ink comprising the water-based ink of Item 1.

(10) A method of forming an image comprising the step of:
ejecting droplets of the water-based ink of Item 1 from an ink-jet head onto an ink receiving medium based on digital signals.

DESCRIPTION OF PREFERRED EMBODIMENTS

This invention will now be detailed in the following.

In this invention, the total amount of monomers presenting in a water-based ink is necessarily not more than 5,000 ppm. It is preferably 0.1-5,000 ppm, more preferably 0.1-1,000 ppm, specifically preferably 0.1-500 ppm and most preferably 0.1-100 ppm. When the total amount of monomers is over 5,000 ppm, the dispersion stability of colored microparticles may be deteriorated.

Particularly, it is preferable that the total amount of monomers having a homopolymer converted SP value of not more than 20 $(J/cm^3)^{1/2}$ among monomers remaining in a water-based ink is not more than 1,000 ppm. It is further more preferable not more than 500 ppm and specifically preferably not more than 100 ppm.

This is because the inventors of this invention have proved as a result of many experiments that particularly a residual amount of such monomers having a low polarity is a dominant factor of the unstableness of colored microparticles. Various capabilities have been remarkably improved by setting these factors in an appropriate range. The homopolymer converted SP value of a monomer in this invention can be determined by the value, the measurement method and the calculation method described in Polymer Handbook, 4$^{th}$ edition, p. 675 (John Wiley & Sons, Inc.).

Specifically, monomers having a SP value of not less than 20 $(J/cm^3)^{1/2}$ include such as acrylic acid (24.5), methylaclylate (20.7) and methacrylic acid (20.2) and monomers having a SP value of not more than 20 $(J/cm^3)^{1/2}$ include such as ethylacrylate (19.2), n-butylaclylate (18.01), methylmethacrylate (18.21), t-butylacrylate (17.4), ethylmethacrylate (17.0), n-butylmethacrylate (17.9) and isobutylmethacrylate (14.7). The value in the parenthesis represents each SP value.

In this invention, an elimination process of a residual monomer is preferably provided during the manufacturing process of colored particles. An ultrafiltration or an adsorbent treatment is preferred for the monomer elimination.

The ultrafiltration is more preferably performed using a membrane filter under increased or reduced pressure. Membrane filters available on the market include, for example, NTU-2120, 3150 and 3250 (manufactured by Nitto Denko Corp.), Microza (manufactured by Asahi Chemical Industrial Co., Ltd.), Minicloth and Clothflow Module (manufactured by Toyobo Co., Ltd.). As ultrafiltration devices, utilized may be those manufactured by Nitto Denko Corp.

Further, adsorbents employed in the adsorbent treatment include inorganic adsorbents such as zeolite, alumina, silica gel, activated clay and diatomaceous earth; and organic adsorbents such as active carbon, synthetic resin for an adsorbent, and ion exchange resin.

These adsorbents may be added directly into a solution to be treated, or a solution to be treated may be passed through a column filled with the adsorbent. Further, these adsorbent treatments may be utilized alone or in combinations of two or more types.

Adsorbents utilized on the market include, for example, Galeonearth (manufactured by Mizusawa Chemical Industry Co., Ltd.) as activated clay, Taiko S, K and P (manufactured by Nimura Chemical Industry Co., Ltd.), Shirasagi A, M, C and P (manufactured by Takeda Chemical Industries, Ltd.), Baiho A, MA, and HC (manufactured by Taihei Chemical & Co., Ltd.), GS-A, GS-B and CL-K (manufactured by Ajinomoto Fine-Techno Co., Ltd.) as active carbon.

Further, adsorbent synthetic resin includes, for example, Diaion HP10, HP30 and HP2MG, Sepabeads SP70, SP700, SP825 and SP850 (manufactured by Mitsubishi Chemical Corp.), Anberlight XAD4, XAD7HP, XAD16HP and XAD1180 (manufactured by Organo Corp.), KS and KH (Ajinomoto Fine-Techno Co., Ltd.). Ion exchange resin includes, for example, Diaion PK208, PK216, PA306, PA312, WK10, WK20 and CR11 (manufactured by Mitsubishi Chemical Corp.), Anberlight IRC50, IRC76, IRA400, IRA410 and IRC748 (manufactured by Organo Corp.), PF, SB and MA (manufactured by Ajinomoto Fine-Techno Co., Ltd.).

Colored microparticles of this invention having a core/shell structure can be prepared by a method in which a polymer shell is formed after forming a polymer core containing a colorant (dye), or by a method in which a core and a shell are simultaneously formed.

(In the Case of Forming a Shell After Forming a Microparticle Core (Colorant Particle))

"Dye-containing polymer which forms a core can be prepared by various methods. For example, there is a method in which an oil-soluble dye is dissolved in a monomer, and after which has been emulsified in water, the dye is sealed in a polymer by polymerization; a method in which a polymer and a dye are dissolved in an organic solvent, and after which has been emulsified in water, the organic solvent is removed; or a method in which porous polymer microparticles are added into a dye solution and the dye is adsorbed on and immersed into the microparticles. In addition to this, methods to provide a polymer shell include a method in which a water-soluble dispersant is added into a water-based suspension of a dye-containing polymer and is adsorbed; a method in which a monomer is gradually added drop-wise and is precipitated on the core surface simultaneously with polymerization; or a method in which a polymer dissolved in an organic solvent is gradually added drop-wise, and is adsorbed on the core surface simultaneous with the precipitation. For example, in this invention, employed is a method in which a polymerizing monomer provided with hydroxyethylmethacrylate and a monomer having an unsaturated double bond are gradually added into a water-based suspension of a dye containing polymer which forms a core, and is precipitated on the core surface."

(Method to Prepare Core and Shell Simultaneously During Micro-particle Formation)

Utilized can be a method in which after a polymer and a dye, to form a core, having been polymerized, which are dissolved or dispersed in a shell-forming monomer and are suspended to be polymerized; and a method in which the solution is gradually added drop-wise into water containing surfactant micelles to perform emulsion polymerization. A monomer having been polymerized may form a core and a material added as a polymer may form a shell. In addition to this, employed can be a method in which a dye is dissolved or dispersed in a mixed solution, comprising a monomer to be a core and a monomer to be a shell, after the polymerization, and which is subjected to suspension polymerization or emulsion polymerization.

In this invention, specifically preferable is a method in which a monomer is gradually added drop-wise into a water-based suspension of a core forming polymer and is precipitated on the core surface when being polymerized.

(Evaluation of Core/shell Formation)

It is important to evaluate whether core/shell formation is actually performed or not. In this invention, since the individual particle diameter is as small as not more than 100 nm, the analytical method is limited with respect to the resolution. As a suitable method for such a purpose, employed can be a TEM or a TOF-SIMS. When core/shell formed microparticles are observed through a TEM, the dispersion may be coated on a carbon membrane which is dried and observed. Because a TEM observation image of a polymer type of an organic compound itself may show a low contrast difference, it is preferred that the microparticles are dyed using compounds such as osmium tetraoxide, ruthenium tetraoxiode, chlorosulfonic acid/uranyl acetate and silver sulfide. Microparticles comprising a core only is dyed and observed through a TEM, and which is compared with those further provided with a shell. Further, after mixing microparticles provided with a shell and those without a shell, which are dyed to confirm whether the ratio of microparticles having different dyed degrees is identical with-the ratio of those with and without a shell.

Further, a core/shell particle can be more clearly observed by being berried into epoxy resin, which is cut into an ultra-thin slice using a microtome, and is dyed. As described above, when an element which can be a probe is presents in a polymer or a colorant, the composition and distribution amount of the dye in a core and a shell can be estimated also by means of a TOF-SIMS or a TEM.

To obtain a required particle diameter, optimization of a recipe and selection of a suitable emulsifying method are important. The recipe differs depending on a colorant and a polymer utilized, however, it is a suspension in water so that a shell-constituting polymer is necessary to be generally more hydrophilic compared to a core-constituting polymer. Further, the amount of a colorant contained in a shell constituting polymer is preferably less than that in a core-constituting polymer, as described above, and the amount of a colorant is necessary to be also less than the amount of a shell constituting polymer. Hydrophilicity and hydrophobicity can be estimated, for example, using a solubility parameter (SP). With respect to a solubility parameter, the value, measurement and calculation method may be referred to the descriptions of Polymer Handbook, Version 4, p.675-.

Further, a polymer utilized in a core preferably has a number average molecular weight of 500-100,000 and specifically preferably 1,000-30,000, with respect to a film forming property after printing, durability thereof, and a suspension forming capability.

Employed can be a variety of Tg (glass transition temperature) of said polymer, it is preferred that at least one type among the polymers utilized has a Tg of at least 10° C.

In this invention, any commonly known polymers can be utilized, however, specifically preferable polymers are those having an acetal group, those having an carbonic acid ester group, those having a hydroxyl group or those having an ester group, as a primary functional group. Polymers described above may be further provided with a substituent, and said substituent may have a straight chain, branched or cyclic structure. Further, polymers having the above functional groups are available on the market in various types and can be also synthesized by a conventional method. Further, these copolymers can be prepared, for example, by introducing an epoxy group into one polymer molecule, which are condensation polymerized with another polymer or graft polymerized by use of light or radiation.

In a preferred water-based dispersion of colored microparticles, a polymer core primarily contains a colorant (dye) and contributes to keep durability and tone, while a polymer shell contributes to increase stability as an ink suspension of microparticles containing a dye as well as to accelerate fixing of a dye and prevent aggregation on a medium, resulting in improvement of image quality. Further, the polymer shell contributes also to fastness of a dye and retention of tone.

In this invention, since dye containing core/shell colored microparticles, utilized in a polymer emulsion type a water-based ink, give a very large surface area per a unit volume when a volume average particle diameter is not more than 5 μm, the effect to seal a dye in a core/shell polymer is decreased. On the other hand, particles as large as over 100 nm in size is liable to clog in a head and precipitates in the ink, resulting in deterioration of standing stability. Therefore, the average particle diameter of colored microparticles is preferably 5-100 nm and more preferably 10-100 nm, and when it is over 100 nm in the case of a water-based ink, glossiness of images recorded on a glossy medium is deteriorated and transparency of images recorded on a transparent medium is terribly deteriorated.

A volume average particle diameter can be determined by spherically converting the average equivalent circular particle diameter obtained from an average value of projected areas (being measured with respect to at least 100 particles) in the pictures by a transmission electronmicroscopy (TEM). A volume average particle diameter and a standard deviation thereof are determined to calculate a coefficient of variation by dividing the standard deviation with the volume average particle diameter. The coefficient of variation can be also determined utilizing a dynamic light scattering method. For example, it can be determined by use of Laser Particle Diameter Analyzing System, produced by Otsuka Denshi Co., Ltd. or Zeta Analyzer, produced by Malbahn Co., Ltd.

A coefficient of variation of a particle diameter is a value of a standard deviation of a particle diameter divided by a particle diameter, and the larger is this value means that the wider is the distribution of a particle diameter. When the coefficient of a volume average particle diameter is not less than 80%, the particle distribution becomes extraordinarily wide and a thickness of the core/shell is liable to become heavy resulting in variation by particles of the surface physical properties. The variation of surface physical properties easily causes aggregation of particles, and which causes clogging of an ink-jet head. Further, particle aggregation is liable to cause light scattering of a colorant on a medium as well as deterioration of image quality. The coefficient of a particle diameter is preferably not more than 50% and more preferably not more than 30%.

In this invention, the amount of a polymer utilized in a shell is preferably 5-95 weight % of the total amount of a polymer. A thickness of a shell is not sufficient when it is not more than 5%, and a part of a core containing plenty of a dye is apt to be exposed on the particle surface. While capability of a core to protect a colorant is easily deteriorated when the polymer amount in a shell is too much. It is furthermore preferably 10-90 weight %.

The total amount of a dye is preferably 20-1,000 weight % of the total amount of a polymer. Image densities do not increase after ejection when the dye amount is too small compared to that of a polymer, while protecting capability of a polymer is not sufficient when the weight of a dye is too much.

Next, a dye which is sealed by the above polymer will be explained.

The hue of dyes utilized in this invention are preferably yellow, magenta, cyan, black, blue, green and red, and specifically preferably utilized is each dye of yellow, magenta, cyan and black. Oil soluble dyes are dyes which are generally provided with no water-soluble groups such as carboxylic acid and sulfonic acid and are soluble in an organic solvent but insoluble in water, however, include dyes exhibiting an oil-soluble property by salt formation of a water-soluble dye with a long chain base. For example, there are known salt-forming dyes of acid dyes, direct dyes and active dyes with long chain amines. Oil soluble dyes are not limited to the following, however, include as specifically preferable examples, Valifast Yellow 4120, 3150, 3108 2310N and 1101; Valifast Red 3320, 3304 and 1306; Valifast Blue 2610, 2606 and 1603; Oil Yellow GG-S, 3G, 129, 107 and 105; Oil Scarlet 308; Oil Red RR, OG and 5B; Oil Pink 312; Oil Blue BOS, 613 and 2N; Oil Black BY, BS, 860, 5970, 5906 and 5905: manufactured by Orient Chemical Industry Co., Ltd.; Kayaset Yellow SF-G, K-CL, GN, A-G and 2G; Kayaset Red SF-4G, K-BL and A-BR; Kayaset Magenta 312; Kayaset Blue K-FL: manufactured by Nippon Kayaku Co., Ltd.; FS Yellow 1015; FS Magenta 1404; FS Cyan 1522; FS Blue 1504; C.I. Solvent Yellow 88, 83, 82, 79, 56, 29, 19, 16, 14, 04, 03, 02 and 01; C. I. Solvent Red 84:1; C. I. Solvent Red 84, 218, 132, 73, 72, 51, 43, 27, 24, 18 and 01; C. I. Solvent Blue 70, 67, 44, 40, 35, 11, 02 and 01; C. I. Solvent Black 43, 70, 34, 29, 27, 22, 7 and 3; C. I. Solvent Violet 3; C. I. Solvent Green 3 and 7: manufactured by Arimoto Chemical Industry Co., Ltd. Further, also preferably utilized can be metal complex dyes such as described in JP-A Nos. 9-277693, 10-20559 and 10-30061.

Dispersed dyes can be utilized as an oil-soluble dye. Dispersed dyes are not limited to the following, however, include as specifically preferable examples, C. I. Disperse Yellow 5, 42, 54, 64, 79, 82, 83, 93, 99, 100, 119, 122, 124, 126, 160, 184:1, 186, 198, 199, 204, 224 and 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C. I. Disperse Green 6:1 and 9.

Colored microparticles of this invention provided with a core/shell structure are preferably blended in a water-based ink of this invention at 0.5-50.0 weight % as the polymer amount and more preferably at 0.5-30 weight %. The ability to protect a dye is not sufficient when the above polymer content is less than 0.5 weight %, while stability of suspension as ink may be deteriorated resulting in clogging of a printer head due to viscosity increase of the ink or aggregation of the suspension incorporated with ink evaporation at a nozzle apex when it is over 50.0 weight %; therefore it is preferably in the above range.

On the other hand, the above dye is preferably blended in said ink at 1-30 weight % and more preferably 1.5-25.0 weight %. The printed density is not sufficient when the blending amount is less than 1 weight %, while stability of the suspension is deteriorated resulting in a tendency to increase the particle diameter due to aggregation when it is over 30 weight %; therefore it is preferably in the above range.

Ink of this invention comprised of a suspension, in water as a medium, of a polymer in which the dye above described is sealed, and appropriately added in said suspension can be commonly known various additives such as an inorganic salt, a surfactant, an antiseptic agent, an anti-mold agent, a pH controlling agent, a viscosity adjusting agent, a hydrotropic agent, a wetting agent, a dispersant and a defoaming agent.

An inorganic salt may be added in ink to maintain ink viscosity stable or to improve coloration. Inorganic salts include, for example, sodium chloride, sodium sulfate, magnesium chloride and magnesium sulfide.

As surfactants, utilized can be any of cationic, anionic, amphoteric or nonionic, however, a nonionic surfactant is preferred.

Cationic surfactants include an aliphatic amine salt, an aliphatic quaternary ammonium salt, a benzalconium salt, benzethonium chloride, a pyridinium salt and an imidazolium salt.

Anionic surfactants include a fatty acid soap, an N-acyl-N-methylglycine salt, an N-acyl-N-methyl-β-alanine salt, N-acylglutamate, alkylethercarboxylate, acylated peptide, alkylsulfonate, alkylbenzenesulfonate, alkylnaphthalenesulfonate, alkylsulfosuccinate ester, alkylsulfoacetate, α-olefinsulfonate, N-acylmethyltauline, sulfated oil, higher alcohol sulfate ester, secondary higher alcohol sulfate ester, alkylether sulfate, secondary higher alcohol sulfate ester, alkylether sulfate, secondary higher alcohol ethoxysulfate, polyoxyethylene alkylphenylether sulfate, monoglysulfate, fatty acid alkylolamide sulfate ester, alkylether phosphate ester and alkylphosphate ester.

Amphoteric surfactants include a carboxybetaine type, a sulfobetaine type, aminocarboxylate and imidazolium betaine.

Nonionic surfactants include polyoxyethylene alkylether, polyoxyethylene secondary alcoholether, polyoxyethylene alkylphenylether (such as Emalgen 911), polyoxyethylene sterolether, polyoxyethylene lanoline derivatives, polyoxyethylene polyoxypropylenealkylether (such as Newpole PE-62), polyoxyethyleneglycerine fatty acid ester, polyoxyethylene castor oil, cured castor oil, polyoxyethylenesorbitan fatty acid ester, polyoxyethylenesorbitol fatty acid ester, polyoxyethyleneglycol fatty acid ester, fatty acid mnoglyceride, polyglycerine fatty acid ester, sorbitan fatty acid ester, propyleneglycol fatty acid ester, saccharose fatty acid ester, fatty acid alkanolamide, polyoxyethylene fatty acid amide, polyoxyethylene alkylamine, alkylamineoxide, acetylene glycol and acetylene alcohol.

In the case of utilizing these surfactants, they can be utilized alone or in combinations of two or more types and added in a range of 0.001-1.0 weight % per the total amount of ink to arbitrarily adjust the surface tension.

An anti-septic agent and an anti-mold agent may be added in ink to maintain long term storage stability of the ink. An anti-septic agent and an anti-mold agent include an aromatic halogen compound (such as Preventol CMK), methylene dithiocyanato, a halogen containing nitrogen sulfide compound and 1,2-benzoisothiazoline-3-one (such as Proxel GXL).

A pH controlling agent may be added to maintain the inside of ink stable. As a pH controlling agent, hydrochloric acid, acetic acid, citric acid, sodium hydroxide and potassium hydroxide can be utilized by being diluted with water or as they are.

As a wetting agent, for example, polyhydric alcohols and ether thereof such as ethylene glycol, propylene glycol, diethylene glycol, triethylene glycol, tetraethylene glycol, polyethylene glycol, glycerin, diethyleneglycol diethylether, diethyleneglycol monobutylether, ethyleneglycol monomethylether, ethyleneglycol monoethylether, ethyleneglycol monobutylether, methyl carbitol, ethyl carbitol, butyl carbitol, ethyl carbitol acetate, diethyl carbitol, triethyleneglycol monomethylether, triethyleneglycol monoethylether and propyleneglycol monomethylether; acetate series; nitrogen containing compounds such as N-methyl-pyrolidone, 1,3-dimethylimidazolidinone, ethanolamine, formamide and dimethylformamide; and dimethylsulfoxide can be utilized alone or in combinations of two or more types. The blending amount of these wetting agents is not limited, however, they can be preferably blended in the aforesaid a water-based ink at 0.1-50.0 weight % and more preferably 0.3-30.0 weight %.

Dispersants are not specifically limited, however, preferably have a HLB (hydrophilicity/hydrophobicity balance) value of 8-18 with respect to exhibiting the effects as a dispersant as well as the preventing effect against an increase of a particle diameter of the suspension. Dispersants for disperse dyes include such as alkylnaphthalene sulfonate, however, preferred are anionic surfactants having a low molecular weight such as low molecular weight sodium dodecylsulfate and sodium dodecylbenzenesulfonate.

Dispersants available on the market can be also utilized. Such products available on the market include Dispersant Demol SNB, MS, N, SSL, ST and P (product names), manufactured by Kao Corp.

The blending amount of a dispersant is not specifically limited, however, is preferably 0.01-10.0 weight % in the a water-based ink of this invention. Minimization of a particle diameter of the suspension is difficult when said blending amount is less than 0.01 weight %, while a particle diameter of the suspension may increase or stability of the suspension may be deteriorated possibly resulting in gelation when it is over 10 weight %; therefore it is preferably in the aforesaid range.

Further, as a defoaming agent, products available on the market can be utilized without specific limitation. Such products available on the market include, for example, KF-96, 66, 69, KS68, 604, 607A, 602, 603, KM73, 73A, 73E, 72, 72A, 72C, 72F, 82F, 70, 71, 75, 80, 83A, 85, 89, 90, 68-1F and 68-2F (product names), manufactured by Shin-Etsu Silicone Co., Ltd. The blending amount of these compounds is not specifically limited, however, is preferably 0.001-2.0 weight % in a water-based ink of this invention. Foams are easily generated during ink preparation or tiny foams in ink are hardly removed when the blending amount of said compound is less than 0.001 weight %, while generation of foams is restrained but there may caused repellent spots in the ink resulting in deterioration of print quality when it exceeds 2.0 weight %; therefore it is preferably in the aforesaid range.

Next, emulsifying method employed in manufacturing of ink of this invention will be explained. In ink of the invention, various emulsifying methods can be utilized, for example, in the preparation of colorant particles to form a core. Various methods can be employed as emulsifying methods. The examples are summarized, for example, in descriptions at p.86 of "Progress and Applications of Functional Emulsifiers/Emulsifying Techniques (C. M. C.)". In this invention, in particular, emulsifying devices by means of ultrasonic wave, high-speed rotational shearing or high pressure are preferably utilized.

In emulsification by means of ultrasonic wave, two ways of so-called a batch type and a continuous type, may be usable. A batch type is suitable for preparation of a relatively small amount of a sample, while a continuous type is suitable for preparation of a large amount of a sample. In a continuous type, for example, an apparatus such as a UH-600SR (produced by S. M. T. Co., Ltd.) can be utilized. When such a continuous type is employed, an irradiation time duration of ultrasonic wave can be determined as "volume of a dispersion chamber"/("flow rate"×"circulation times"). When plural sets of ultrasonic irradiation apparatuses are employed, it can be determined as the total of each irradiation time duration. The irradiation time duration of ultrasonic waves is practically not longer than 10,000 seconds. Further, manufacturing load is large when a time duration longer than 10,000 seconds is required, and it is practically required to shorten the emulsifying time duration such as by selecting an emulsifier. Therefore, the time duration is not more than 10,000 seconds and more preferably in a range of 10-2,000 seconds.

As emulsifying apparatus by means of high-speed rotational shearing, utilized can be Dispermixer described at pp. 255-256, Homomixer at p. 251 or Ultramixer at p. 256 of "Progress and Applications of Functional Emulsifiers/Emulsifying Techniques (C. M. C.)". These types can be appropriately utilized depending on viscosity during the emulsifying process.

In these emulsifying apparatus by means of high-speed rotational shearing, the rpm of the stirring fan is important. In the case of an apparatus provided with a stator, since the clearance between a stirring fan and a stator is generally approximately 0.5 mm and can not be made extremely narrow, the shearing force primarily depends on a circumferential speed of the stirring fan. The rate of 5-150 m/sec may be utilizable for emulsification/dispersion of this invention. Minimization of a particle diameter may be barely achieved even with a prolonged emulsifying time duration when the circumferential speed is too late, while the ability of a motor is required to be extremely increased to make a circumferential speed of 150 m/sec. It is further more 20-100 m/sec.

In emulsifying dispersion by means of high pressure, such as LAB 2000 (produced by S. M. T. Co., Ltd.) can be utilized, and the emulsification/dispersion ability depends on a pressure applied on a sample. The pressure is preferably in a range of $10^4$-$5\times10^5$ kPa. Further, a few times of emulsification/dispersion may be appropriately performed to obtain an desired particle diameter. The desired particle diameter is barely obtained even with repeated emulsifying dispersion when the pressure is too low, while it is not practical to make a pressure of $5\times10^5$ kPa due to a large burden to an apparatus. It is more preferably in a range of $5\times10^4$-$2\times10^5$ kPa.

These emulsification/dispersion apparatus can be utilized alone or in combinations appropriately. The object of this invention cannot be achieved by use of a colloidal mill or a flow-jet mixer alone, however, the effects of this invention, such as to enable emulsification/dispersion in a short period, can be enhanced by the combinations with apparatuses of this invention.

In the case of image formation by ejecting a water-based ink of this invention by means of an ink-jet method, a utilized ink-jet head may be either of an on-demand mode or of a continuous mode. Further, as an ejection mode, employed can be any of an electromechanical conversion mode (a single cavity type, a double cavity type, a bender type, a piston type, a share-mode type or a shared-wall type) and a electro-thermal conversion mode (a thermal ink-jet type or a bubble jet (R) type).

In an image forming method employing a water-based ink of this invention, for example, an ink-jet print in which an image is formed on an ink-jet recording medium can be obtained by using, for example, a printer loaded with a water-based ink, which is ejected as droplets from an ink-jet head based on digital signals and adhered onto an ink receiving element.

As an ink-jet image recording medium, utilized can be any of, for example, plain paper, coated paper, cast coated paper, glossy paper, glossy film or OHP film, and preferable is, in particular, for example, a so-called recording medium provided with a void layer, in which a porous layer having been formed. The raw materials or shapes of the aforesaid support are not specifically limited, and, for example, utilized may be those having a steric structure in addition to those of a sheet-form.

A water-based ink of this invention can be utilized for example as ink for writing tools such as a fountain pen, a ball-point pen and a felt pen in addition to ink for an ink-jet recording application. Powder comprising microparticles also can be prepared by drying a suspension of this invention. Obtained powder can be utilized for such as a toner of electrophotography.

EXAMPLES

Next, this invention will be further detailed with reference to examples, however, this invention is not limited to these examples.

Dye colored microparticles of a core/shell type are prepared as follows.

Comparative Preparation Example 1

Polyvinylbutyral (3000K, manufactured by Denki-Kagaku Co., Ltd., having an average polymerization degree of 800) of 50 g, 40 g of C. I. Solvent Yellow 162, 10 g of C. I. Solvent Yellow 29 and 400 g of ethyl acetate are charged in a separable flask and said polymer and dyes were stirred to be completely dissolved. After titrating 1000 g of an aqueous solution containing 5 g of sodium laurylsulfate, the system was emulsified for 10 minutes by use of an ultrasonic homogenizer (UH-150 type, produced by S. M. T. Co., Ltd.). Thereafter, ethyl acetate was removed under reduced pressure to prepare a colored micro-particle dispersion in which dyes having been immersed.

After replacing inside the flask by nitrogen, 1.5 g of potassium persulfate were added to this dispersion to be dissolved, and the system was heated at 70° C. with a heater, which was reacted for 4 hours while a mixed solution of 20 g of styrene and 10 g of 2-hydroxyethyl methacrylate were titrated, to prepare yellow colored microparticles of a core/shell type.

The mean particle diameter of the microparticles was 88 nm (volume average particle diameter measured by Laser Particle Analyzing System, produced by Otsuka-Denshi Co., Ltd.).

Preparation Example 1

Colored microparticles were prepared in a similar manner to comparative example 1, except that the shell forming reaction condition of 70° C./4 hours was changed to 80° C./7 hours. The mean particle diameter was 92 nm.

Preparation Example 2

Yellow colored microparticles were prepared in a similar manner to comparative preparation example 1, except that the shell forming reaction condition of 70° C./4 hours was changed to 70° C./7 hours and 0.1 g of active carbon (Shirasagi P, manufactured by Takeda Chemical Industries, Ltd.) was added into the obtained dispersion which was filtered through a 0.8 μm membrane filter after having been stirred for 1 hour. The mean particle diameter was 89 nm.

Comparative Preparation Example 2

Polyvinylbutyral (BL-S, manufactured by Sekisui Chemical Co., Ltd., having an average polymerization degree of 350) of 50 g, 60 g of C. I. Solvent Blue 70 and 500 g of ethyl acetate are charged in a separable flask and said polymer and dyes were stirred to be completely dissolved. After titrating 900 g of an aqueous solution containing 1 g of sodium laurylsulfate while stirring, the system was emulsified for 10 minutes by use of an ultrasonic homogenizer (UH-150 type, described above). Thereafter, ethyl acetate was removed under reduced pressure to prepare a colored micro-particle dispersion. After replacing inside the flask by nitrogen, 1 g of potassium persulfate was added to this dispersion to be dissolved, and the system was heated at 70° C. with a heater, which was reacted for 4 hours while a mixed solution of 20 g of styrene, 10 g of 2-ethylhexyl acrylate and 10 g of 2-hydroxyethyl methacrylate were titrated, to prepare blue colored microparticles of a core/shell type. The mean particle diameter was 81 nm.

Preparation Example 3

Blue colored microparticles were prepared in a similar manner to comparative preparation example 2, except that the shell forming reaction condition of 70° C./4 hours was changed to 70° C./7 hours and 0.1 g of active carbon (Taiko S, manufactured by Nimura Chemical Industries, Ltd.) was added into the obtained dispersion, which was filtered through a 0.8 μm membrane filter after having been stirred for 1 hour. The mean particle diameter was 85 nm.

Preparation Example 4

Yellow colored microparticles were prepared in a similar manner to comparative preparation example 2, except that the shell forming reaction condition of 70° C./4 hours was changed to 70° C./7 hours and the obtained dispersion, in which an equivalent volume of water was added, was ultra-filtered through a ultra-filter (A combination of RUM-2 [pump], C10-T [apparatus] and NTU-3250 [filter film], manufactured by Nitto Denko Co., Ltd.) until the volume returns to the original weight. The mean particle diameter was 89 nm.

Preparation Example 5

Yellow colored microparticles were prepared in a similar manner to comparative preparation example 2, except that the shell forming reaction condition of 70° C./4 hours was changed to 70° C./7 hours and the obtained dispersion, in which an equivalent volume of water was added, was ultra-filtered through a ultra-filter (manufactured by Nitto Denko Co., Ltd., being described above) until the volume returns to the original weight, and the system was further filtered through a 0.8 μm membrane filter, after 0.5 g of active carbon (Shirasagi, described above) had been further added and stirred for 1 hour. The mean particle diameter was 89 nm.

(Preparation and Evaluation of A Water-based Ink Containing Colored Microparticles)

The colored microparticles of 7 types prepared according to the aforesaid method each were weighed so as to make the colorant content of 2%, and adjusted to make 15% of ethylene glycol, 15% of glycerin, 0.3% of Surfinol 465 and the residual % of pure water, which was further filtered through a 0.8 μm membrane filter to eliminate dust and coarse particles resulting in preparation of ink-jet inks 1-7.

With respect to each ink, the residual amount of monomers, the residual amount of monomers having a SP value of not more than 20, the particle diameter variation to evaluate storage stability of ink, and the filtration property were evaluated as follows.

Further, the ejection stability and light fastness were evaluated by printing each ink on Konica Photojet Paper QP Glossy (manufactured by Konica Corp.) by use of Ink-jet Printer (Model PM-800). The results are shown altogether in Table 1.

<Residual Monomer>

A GC/MAS measurement was performed using HP 5890 Series II/HP 5971A, produced by Hewlett-Packard Development Co., L.P., to measure each monomer content in ink, and which were summed up. The measurement was performed after concentrating the sample by evaporating water, when the measurement accuracy was not sufficient.

<Residual Monomers Having a SP Value of Not More Than 20>

The residual monomer amounts of styrene (having a SP value of 18) and 2-ethylhexylacrylate (having a SP value of 16) were summed after removing 2-hydroxyethylmethacrylate (having a SP value of 20.2) from the monomer amount obtained by the aforesaid analyzing method.

<Particle Diameter Variation>

Ink was stored at 60° C. for 1 week, and evaluation according to the following three ranks was performed.

A: The particle variation was less than 5%.

B: The particle variation was 5-10% (acceptable rating).

C: The particle variation was not less than 10% (unacceptable for practical use).

<Filtration Property>

After ink has been stored at 60° C. for 1 week, 5 ml of which were sampled and filtered through a 0.8 μm cellulose acetate membrane filter followed by the following evaluation.

A: The whole amount was able to be filtered.

B: Not less than a half amount was able to be filtered (acceptable rating).

C: Only less than a half amount was able to be filtered (unacceptable for practical use).

<Ejection Stability>

One minute stop after 5 minutes continuous print by a printer was repeated 5 times, and the following evaluation was performed.

A: No nozzle flaws were caused (acceptable rating).

B: Nozzle flaws were caused (unacceptable for practical use)

<Light Fastness>

Samples in which the density was varied step-wise were prepared, and the evaluation was performed using Low Temperature Xe Weather Meter XL75 (produced by Suga Testing Apparatus Co., Ltd.). The density change was measured by use of X-Rite 900 (produced by Nippon Flat Plate Materials Co., Ltd.) at the vicinity of the printed density of 1.0. After 1 week test, ("density after the test"/"density before the test")×100(%) was defined as light fastness.

TABLE 1

| Ink No. | Preparation method of colored microparticles | Total amount of residual monomers | Residual amount of monomers having a SP value of less than 20 | Particle diameter variation | Filtration property | Ejection stability | Light fastness |
|---|---|---|---|---|---|---|---|
| 1 (Other than the invention) | Comparative preparation method 1 | 7600 ppm | 4000 ppm | C | C | B | 65 |
| 2 (Invention) | Preparation method 1 | 2900 ppm | 900 ppm | B | A | A | 73 |
| 3 (Invention) | Preparation method 2 | 2000 ppm | 400 ppm | A | A | A | 80 |
| 4 (Other than the invention) | Comparative preparation method 2 | 6100 ppm | 3500 ppm | C | B | B | 79 |
| 5 (Invention) | Preparation method 3 | 1600 ppm | 500 ppm | A | A | A | 86 |
| 6 (Invention) | Preparation method 4 | 900 ppm | 200 ppm | A | A | A | 87 |
| 7 (Invention) | Preparation method 5 | 100 ppm | 50 ppm | A | A | A | 92 |

It is clear from Table 1 that inks 2, 3, 5-7 containing colored microparticles of this invention, in which the residual monomer amount was controlled, were superior in the particle diameter variation and filtration property, as well as have no problems in the storage stability and ejection stability, and also exhibited superior light fastness. On the other hand, comparative inks 1 and 4 containing much amount of residual monomers exhibited a particle diameter increase and were much inferior in the stability as well as exhibited the deteriorated stability and light fastness.

The following effects can be achieved according to this invention.

This invention can provide a water-based ink exhibiting excellent dispersion stability of the colored microparticles, and excellent ejection stability as well as superior light fastness of images when being utilized in ink-jet recording.

What is claimed is:

1. A water-based ink comprising colored microparticles containing a dye and a polymer dispersed in water,
   wherein each of the colored microparticles has a core/shell structure,
   the core comprising a polymer having an acetal group, a carbonic acid ester group, a hydroxyl group or an ester group in the molecule,
   the shell comprising a polymer made from a hydroxyethylmethacrylate monomer and a monomer having an unsaturated double bond in the molecule,
   wherein a total amount of monomer remaining in the colored microparticles is less than or equal to 5000 ppm based on the total weight of the water-based ink, and
   wherein the total amount of monomer remaining in the colored microparticles having a homopolymer converted solubility parameter (SF value) of not more than 20 $(J/cm^3)^{1/2}$ is less than or equal to 1,000 ppm.

2. The water-based ink of claim 1,
   wherein the total amount of monomer remaining in the colored microparticles is less than or equal to 1000 ppm based on the total weight of the water-based ink.

3. The water-based ink of claim 2,
   wherein the total amount of monomer remaining in the colored microparticles is less than or equal to 100 ppm based on the total weight of the water-based ink.

4. The water-based ink of claim 1,
wherein the total amount of monomer having a homopolymer converted solubility parameter (SP value) of not more than 20 $(J/cm^3)^{1/2}$ is not more than 100 ppm.

5. The water-based ink of claim 1,
wherein an average particle diameter of the colored microparticles is not more than 100 nm.

6. A method for manufacturing the water-based ink of claim 1 comprising the steps of:
dispersing the colored microparticles containing the dye and the polymer in water so as to form a dispersion; and
eliminating a monomer in the dispersion by means of ultrafiltration or an adsorbent treatment.

7. An ink-jet ink comprising the water-based ink of claim 1.

8. A method of forming an image comprising the step of:
ejecting droplets of the water-based ink of claim 1 from an ink-jet head onto an ink receiving medium based on digital signals.

9. The water-based ink of claim 1, wherein the polymer in the core has a Tg of at least 10° C.

10. The water-based ink of claim 1,
wherein a coefficient of variation of a particle diameter in the core/shell colored microparticle being 50% or less.

11. The water-based ink of claim 1,
wherein the shell is made from a hydroxyethylmethacrylate monomer and a styrene.

* * * * *